(12) United States Patent
Choi (10) Patent No.: US 7,797,417 B2
(45) Date of Patent: Sep. 14, 2010

(54) METHOD FOR PROVIDING SERVICE IN IP-BASED NETWORK SYSTEM

(75) Inventor: Moon-Jeong Choi, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 910 days.

(21) Appl. No.: 09/967,970

(22) Filed: Oct. 2, 2001

(65) Prior Publication Data

US 2002/0040408 A1 Apr. 4, 2002

(30) Foreign Application Priority Data

Oct. 2, 2000 (KR) .................... 10-2000-0057991

(51) Int. Cl.
*G06F 15/16* (2006.01)
(52) U.S. Cl. ..................... 709/224; 709/245
(58) Field of Classification Search ............... 709/244, 709/223, 209, 245
See application file for complete search history.

(56) References Cited

U.S. PATENT DOCUMENTS

| | | | |
|---|---|---|---|
| 6,298,377 B1 * | 10/2001 | Hartikainen et al. ........ 709/223 |
| 6,393,014 B1 | 5/2002 | Daly et al. |
| 6,523,696 B1 * | 2/2003 | Saito et al. ................ 709/223 |
| 6,792,474 B1 * | 9/2004 | Hopprich et al. ........... 709/245 |
| 7,020,120 B2 * | 3/2006 | Inoue et al. ................ 370/338 |
| 7,200,683 B1 * | 4/2007 | Wang et al. ................ 709/250 |

FOREIGN PATENT DOCUMENTS

| | | |
|---|---|---|
| JP | 09-153902 | 6/1997 |
| JP | 10-261251 | 9/1998 |
| JP | 11-177569 | 7/1999 |
| WO | WO 00/04427 * | 1/2000 |
| WO | WO 00/04427 A1 | 1/2000 |
| WO | WO 01/63874 A2 | 8/2001 |

OTHER PUBLICATIONS

Office Action (issue date: Apr. 5, 2005) issued from Japanese Patent Office with respect to Japanese Patent Application No. 2001-298344 filed on Sep. 27, 2001.

* cited by examiner

*Primary Examiner*—Moustafa M Meky
(74) *Attorney, Agent, or Firm*—Sughrue Mion, PLLC (57) ABSTRACT

A method for providing services in an IP-based network system to control a plurality of devices connected to one another within the network. The method includes the steps of (a) accessing a service lookup device that notifies services provided by the devices within the network, (b) displaying information on the devices connected to the network, (c) displaying a list of services provided by a device selected from the displayed devices, and (d) performing an operation according to a service selected from the displayed list of services. Accordingly, a user can be provided with services by the devices within the network either through a user interface or through a command.

7 Claims, 9 Drawing Sheets

METHOD FOR PROVIDING SERVICE IN IP-BASED NETWORK SYSTEM

BACKGROUND OF THE INVENTION

1. Field of the Invention

The present invention relates to a network structure, and more particularly to a method for providing services in an IP-based network system.

2. Description of the Related Art

Figure 1:
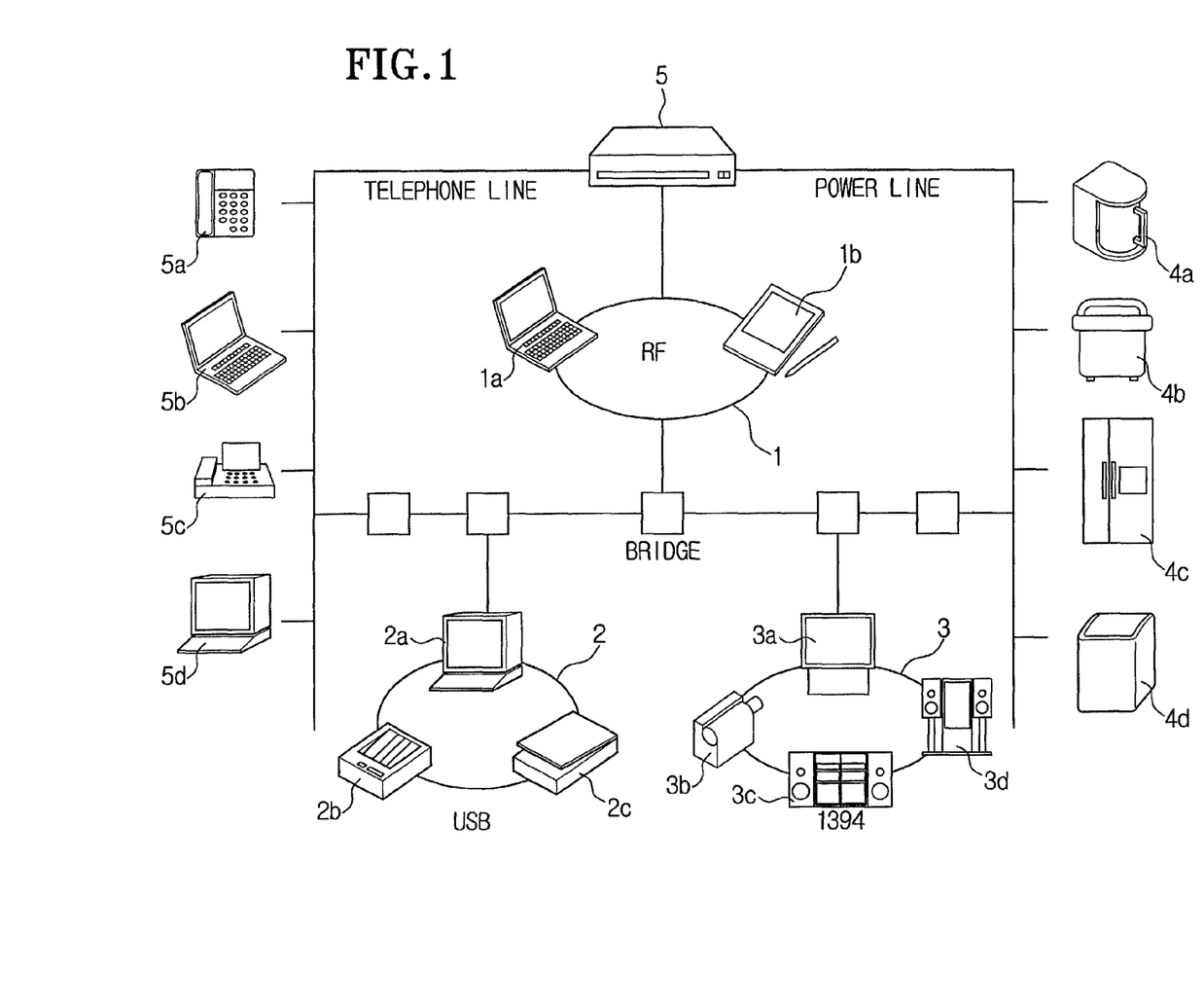
FIG. 1 is a diagram illustrating a structure of a home network in general.

FIG. 1 is a diagram illustrating a structure of a general home network.

Generally, home appliances include information devices such as personal computers, facsimile machines, scanners and printers, A/V devices such as TVs, set-top boxes, DVDs, VCRs, audio components, camcorders and household game machines, control devices such as coffee makers, electric cooking machines, refrigerators, washing machines, microwave ovens and cameras, and dummy devices such as remote controllers, interphones, sensors and lamps.

As shown in FIG. 1, the home appliances are connected within a home network by USB, IEEE1394, a telephone line, a power line, a wireless LAN and Bluetooth.

Since the devices within a home network establish a plurality of different sub-networks, and each device operates on different hardware and software platforms, it is quite difficult to construct a home network.

A method for constructing a home network suggested under these circumstances is to establish a virtual computing environment called "middleware" on the home appliances and provide applications thereon.

Figure 2:
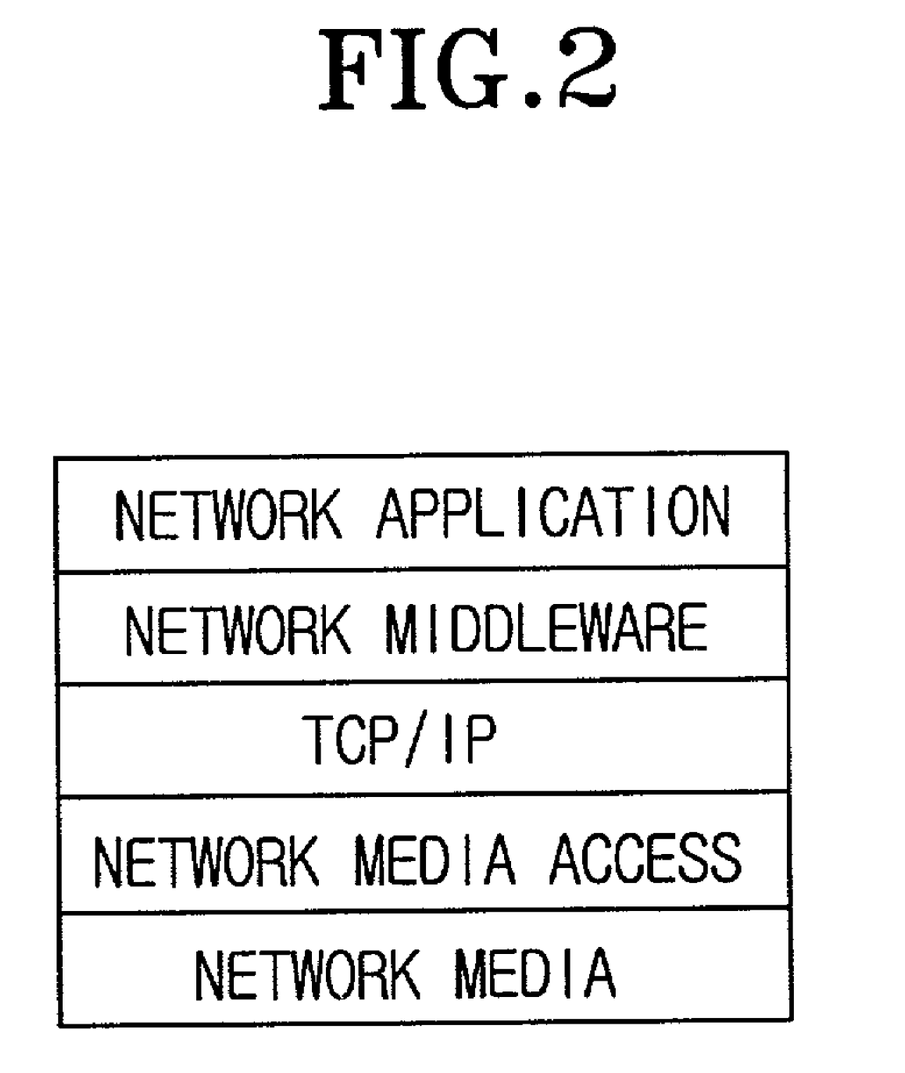
FIG. 2 is a table illustrating a protocol stack of a home network using middleware.

FIG. 2 is a table illustrating a protocol stack of a home network using middleware.

The middleware is software for device communications between devices of different kinds that enables diverse devices to communicate with one another.

The middleware is positioned between an operating system and an application program, and transparently connects dispersed applications and data under a service client service server environment. More specifically, the middleware independently connects hardware along the network to assist a variety of communication protocols, system structures, OS, databases and application programs. Among these, HAVi (Home AV Interoperability) uses a separate protocol stack that is designed based on IEEE1394, but it is insufficient for internetworking.

UpnP (Universal Plug and Play) and JINI, which use a TCP/IP protocol for internetworking as well as for networking between PCs and peripheral devices of the PCs, are also insufficient for transmission of data (audio/video data) in real time between digital home appliances.

Most of the time, the owners and users of home networks are not skilled at building and maintaining the networks. Accordingly, a home network that can be easily constructed is required.

Also, a home network that can receive services anytime and anywhere from the devices within the home network is also critical.

SUMMARY OF THE INVENTION

It is, therefore, an object of the present invention to provide a method for providing services in an IP-based network system so as to provide services through a user interface from a variety of devices used within a network, not only intelligent devices but also dummy devices, by organizing a network based on IP.

It is another object of the present invention to provide a method for providing services in an IP-based network system, which, by forming a network and using commands for devices in the network, enables various service provision not only of intelligent devices but also dummy devices in the network.

In order to achieve the above-described objects of the present invention, there is provided a method for providing services in an IP-based network system to control a plurality of devices that are connected to one another within a network, the method comprising the steps of (a) accessing a service look-up device, which notifies services provided by the devices within the network; (b) displaying information on the devices accessing the network; (c) displaying a list of services provided by a device selected from the displayed devices; and (d) performing an operation according to the selected service once a desired service is selected from the displayed list of services.

There is also provided a method for providing services in an IP-based network system to control a plurality of devices that are connected to one another within a network, the method comprising the steps of inputting conditions for operating devices accessed to the local network; and controlling operation of the devices under the same conditions.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT

A preferred embodiment of the present invention will be described herein with reference to the accompanying drawings. In the following description, well-known functions or constructions are not described in detail since they would obscure the invention in unnecessary detail.

Figure 3:
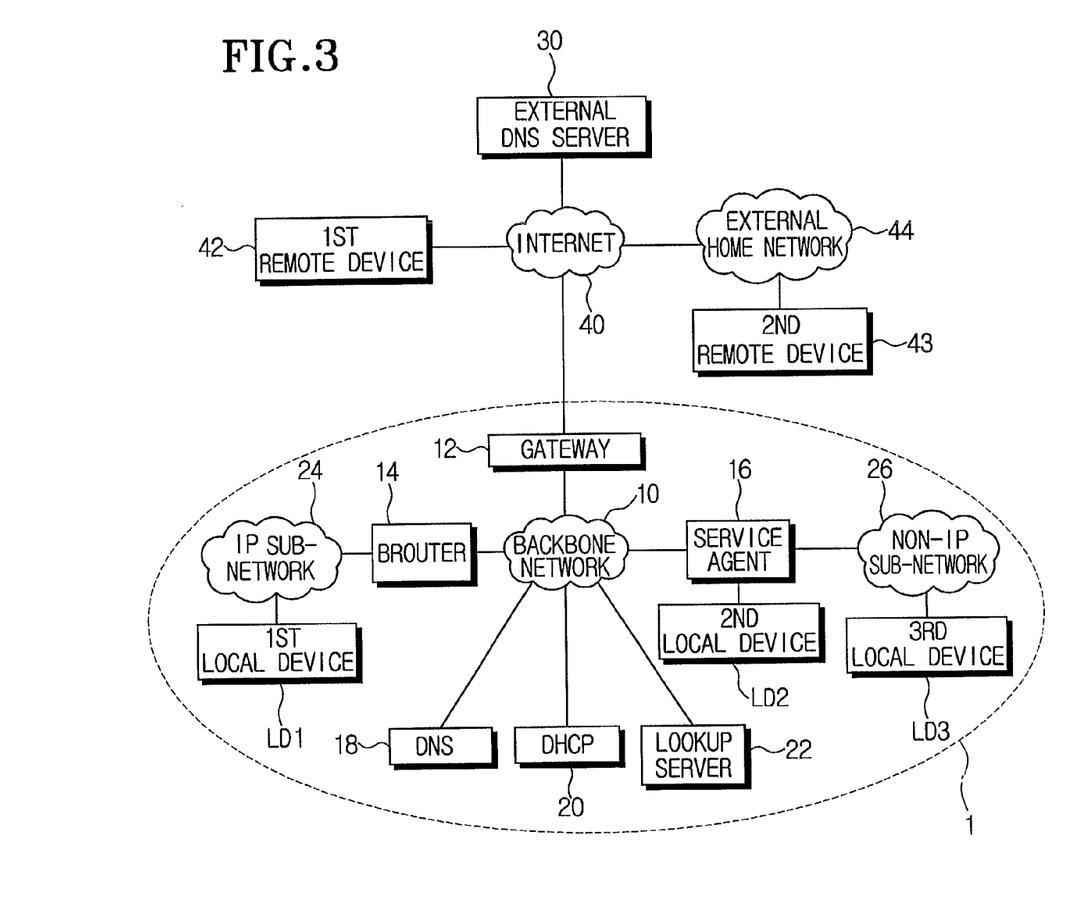
FIG. 3 is a diagram illustrating a structure of a home network according to the present invention.

FIG. 3 is a diagram illustrating a structure of a home network according to the present invention.

A home network 1 includes an IP backbone network 10, a gateway 12, a brouter 14, a service agent 16, a DNS service server 18, a DHCP service server 20, a lookup server 22, an IP sub-network 24, a non-IP server network 26, and local devices LD1, LD2, LD3.

Outside of the home network 1, there are provided a first remote device 42 for accessing a home network, an external DNS service server 30, the Internet 40, an external home network 44, and a second remote device 43 connected to the external home network 44.

The following is a description of the construction of this home network.

The gateway 12 is an entry node enabling the home network 1 to communicate with external networks through the Internet and other home networks. Therefore, a conversion is performed in the gateway 12 between a private IP address assigned to devices of the home network 1 and a public IP address used in an external network.

Also, the intelligent devices within the home network 1 are connected to the IP sub-network 24, while the non-intelligent devices such as dummy devices are connected to the non-IP sub-network 26. The dummy devices, such as lamps, doors and washing machines, cannot control themselves but simply perform specified functions.

The basic protocol inside the home network uses TCP/IP. All the nodes within the home network are distinguished by IP addresses so as to designate a particular node under an environment where a plurality of nodes is connected through the network.

A DNS 18 provides a host name for a device within the home network 1.

Meanwhile, the host name can either be a default name, which is provided in advance to represent a function of the device, or a name made by a user. Where identical default names exist, extension numbers are added for distinguishing one from another. The host name is used when requesting of DHCP 20 a private IP address for a device.

The DHCP 20 provides the devices within the home network 1 with unique identifiers (i.e., IP addresses).

The brouter, a bridge and a router, is positioned between an IP backbone network 1 and an IP sub-network 24 to find the path of an IP packet transmitted between the IP backbone network 1 and the IP sub-network 24.

The service agent 16 positioned between the non-IP sub-network 26 and the IP backbone network 10 converts services on an application level to deliver to the non-IP node the services that use IP networking.

For the devices (hereinafter, called "non-IP devices") in the non-IP sub-network 26 that do not support TCP/IP, the service agent 16 causes private IP addresses to be assigned to the non-IP devices from the DHCP 20 and thus allows the non-IP devices to be connected to the home network.

The service agent 16 also grasps the status of the non-IP node. In other words, the service agent 16 manages information about the status of the non-IP node, such as whether the non-IP node is in power on status, or the non-IP node is inserted in the home network, or the like.

Further, the service agent 16 manages private IP addresses that the service agent 16 caused to be assigned for the non-IP devices, and also, the service agent 16 manages information about the relations between the private IP addresses and hardware addresses of the non-IP devices.

The lookup server 22 manages and provides registration information of the devices within the home network 1.

Since the lookup server 22 manages the IP addresses assigned to the devices within the home network 1, all the nodes within the home network 1 can exchange mutual information irrespective of the network media interface.

The lookup server 22 operates a master page showing information about the devices connected to the home network. Such a master page is re-constructed when the construction of the home network is changed or when the user has accessed the lookup server 22 by means of a browser.

The lookup server 22 enables external communication with the home network by registering the URL of the home network and a public IP address currently assigned to the home network.

Figure 4:
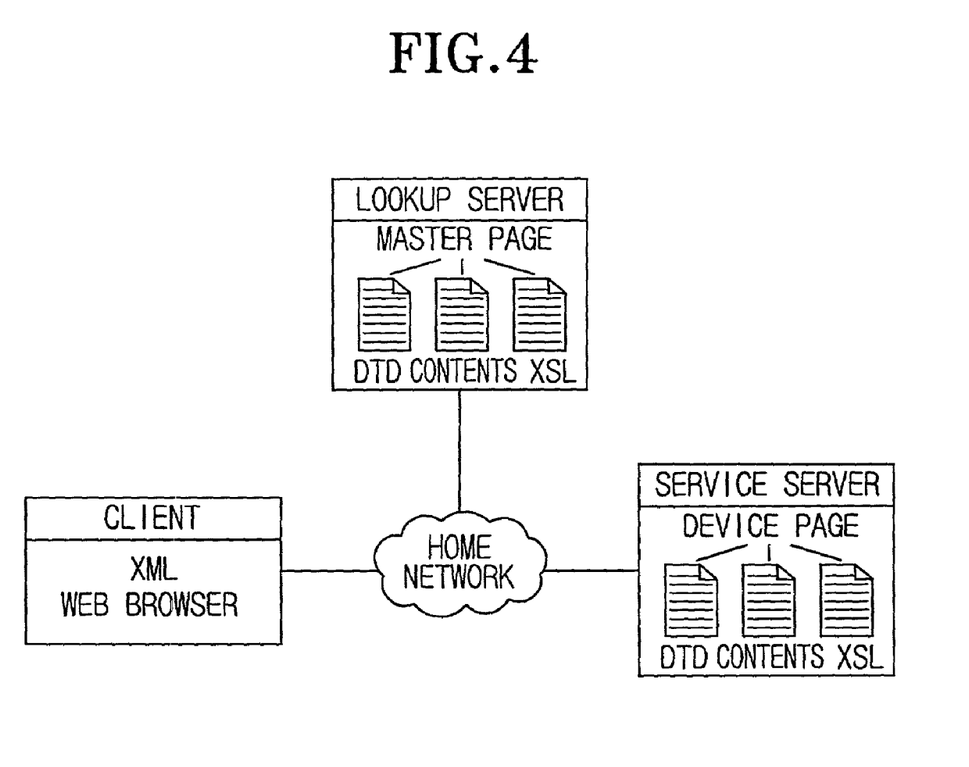
FIG. 4 is a diagram illustrating the structure of a home network expressed into the model of a service client and a service server.

FIG. 4 is a diagram illustrating the structure of a home network expressed as a model of a service client and a service server.

The devices within the home network are defined to be a service client if they request services from other devices, or a service server if they provide other devices with services.

For example, if a user wishes to be provided with desired services by loading a web browser on a web pad to operate a DVD player, the web pad is the service client, while the DVD player is the service server.

According to the present invention, however, no particular device is fixed to be a service client, which is unlike the conventional cases. Instead, a device once operated as the service server and a device once operated as the service client can switch their roles to service client and service server, respectively according to the service request and the provisioning of the devices.

The service server service client interface is classified into direct and indirect interface types.

The direct interface directly exchanges services between the service server and the service client through an IP networking path, while the indirect interface indirectly exchanges services between the service server and the service client through the service agent 16 when the service server is a non-IP node.

The following is a description of an initializing process of the network.

When the power is on, the devices within the home network perform an initializing process to construct a network for mutual communication. An auto-configuration of the network and a registration for services are performed in the initializing process.

The elements required to construct the network are the IP address of a node, a host name of the node, a domain name of the node, a sub-net mask to be used by the node, a default gateway address to be used by the node, and a DNS service server address to be used by the node.

Figure 5:
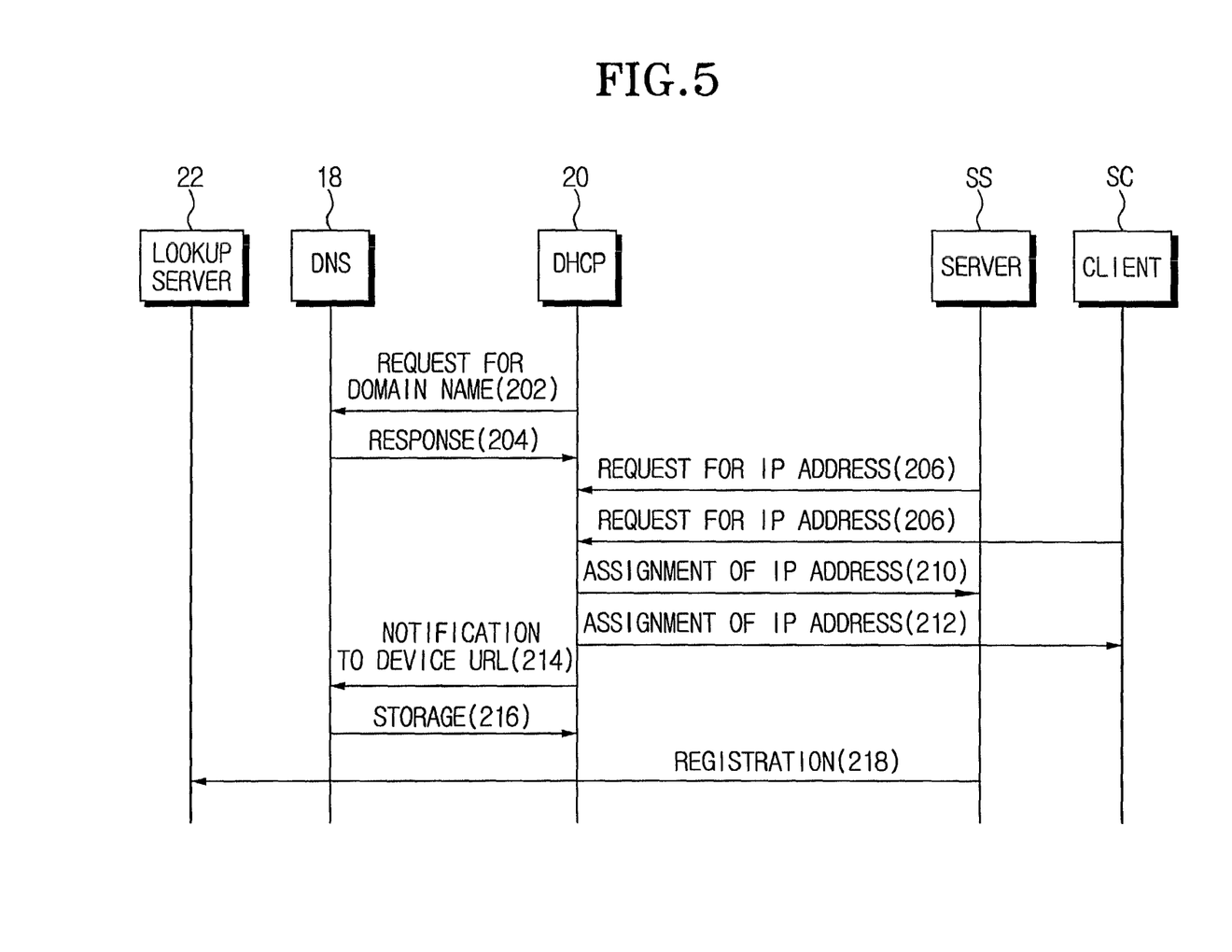
FIG. 5 is a diagram illustrating an initializing process of a home network.

FIG. 5 is a diagram illustrating an initializing process of a home network.

If the DHCP service server 20 requests a domain name from the DNS 18 in order for each node to acquire a private IP address for use (step 202), the DNS 18 responds to the DHCP 20 with a domain name (step 204).

Then, the service server SS and the service client SC in the home network request an IP address from the DHCP service server 20 (steps 206, 208), and the DHCP 20 assigns an IP address to the services server SS and the service client SC (steps 210, 212).

At this stage, the service agent 16 requests an IP address from the DHCP service server 20 for the non-IP devices of the non-IP sub-network 26.

The DHCP 20 notifies the DNS 18 of a domain name and an IP address of the device (step 216), while the DNS 18 stores the domain name and the IP address of the device (step 216).

The service server SS registers in the lookup server 22 the device information such as a device type, a vendor, a model name, a serial number, and information such as an assigned IP address and the URL of the device (step 218).

The services registered in the lookup server 22 are released by the following procedures.

Figure 6:
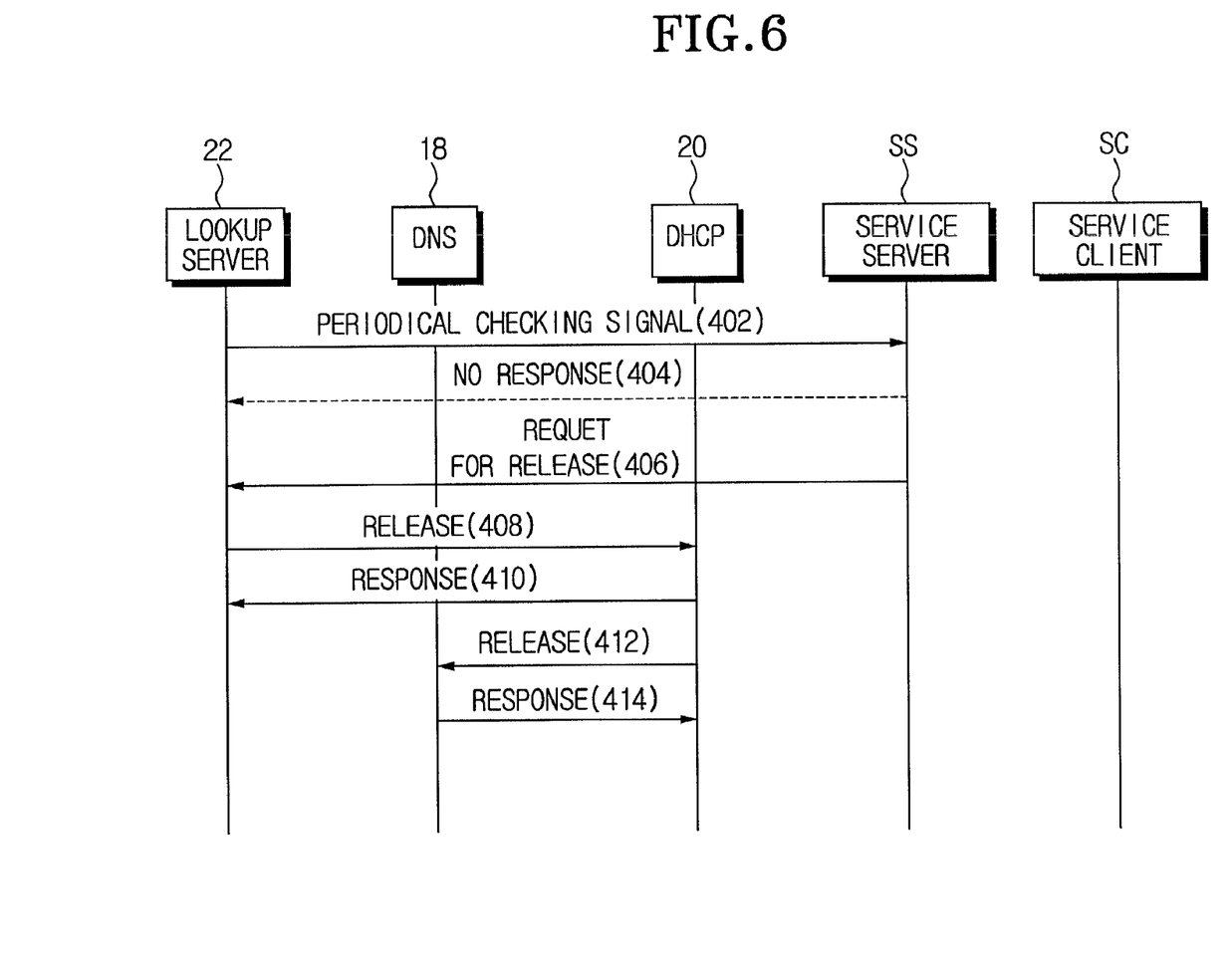
FIG. 6 is a diagram illustrating a process of releasing the service server.

FIG. 6 is a diagram illustrating a process of releasing the service server.

The lookup server 22 periodically transmits status checking signals to the service server SS (step 402). In the absence of a response signal from the service server SS (step 404), the lookup server 22 performs a registration releasing procedure.

The lookup server 22 also performs the registration releasing procedure when the service server requests a release of the registration thereto (step 406).

The lookup server 22 requests the DHCP 20 a release of an assignment of the IP address (step 408). The DHCP 20 then releases an assignment of the IP address (step 410). The DHCP 20 also requests the DNS 18 a release of information registered therein (step 412). The DNS 18 responds to the DHCP 20 with respect to the request for release of the services (step 414).

The following is a description of methods for providing services in an IP-based network system according to the present invention.

The method is classified into a method for providing services through a user interface and a method for providing services through a command.

Figure 7:
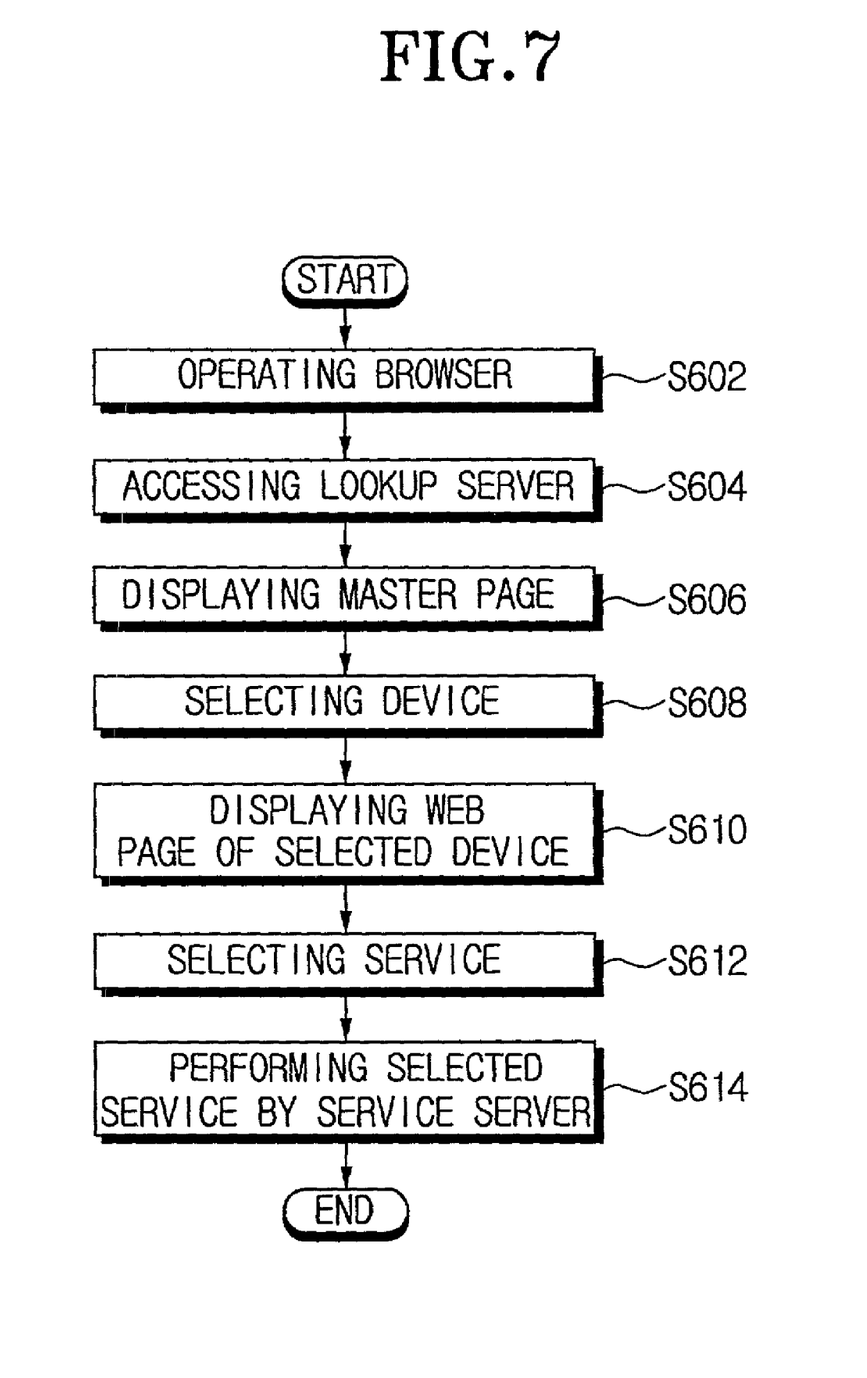
FIG. 7 is a flow chart illustrating a method for providing services through a user interface.

The method for providing services through a user interface will first be described with reference to FIG. 7.

The user operates a browser by using a user interface such as a web pad or a computer (step 602), and accesses a lookup server of the home network (step 604).

Then, a web page showing the devices currently existing on the home network, i.e., a master page is displayed (step 606).

Figure 8:
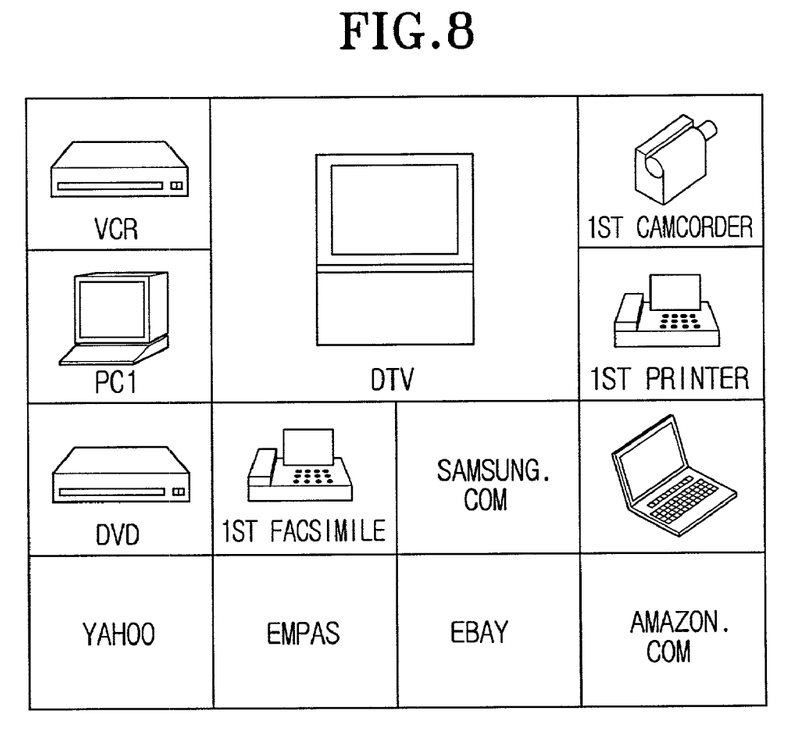
FIG. 8 is a diagram illustrating an example of a master page as displayed.

FIG. 8 is a diagram illustrating an example of a master page as displayed.

FIG. 8, which shows an embodiment of a master page, is modifiable depending on the embodiments, and the connected devices.

As shown in FIG. 8, the devices currently existing on the home network are displayed on the master page in the form of icons together with the names thereof.

Then, the user selects a device that he/she desires to operate (step 608). If the user selects a digital TV, a web page of the digital TV is displayed as shown in FIG. 9 (step 610).

Figure 9:
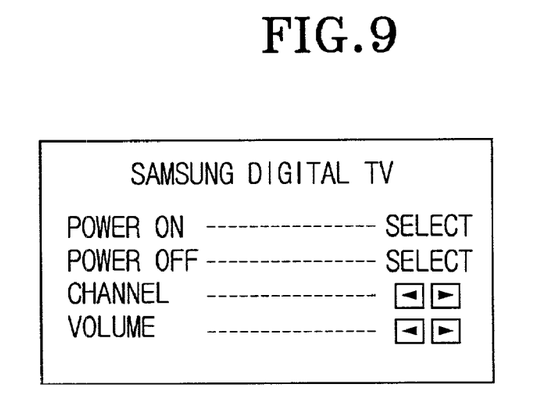
FIG. 9 is a block diagram illustrating a web page of a digital TV as an example of a web page of a device.

As shown in FIG. 9, the services provided by a digital TV such as power on/off, channel up/down or volume up/down are listed on a displayed screen.

Accordingly, the user selects a desired service from the services list (step 612), and the digital TV operates the service selected by the user (step 614).

The following is a description of a process of discovering services between devices.

Figure 10:
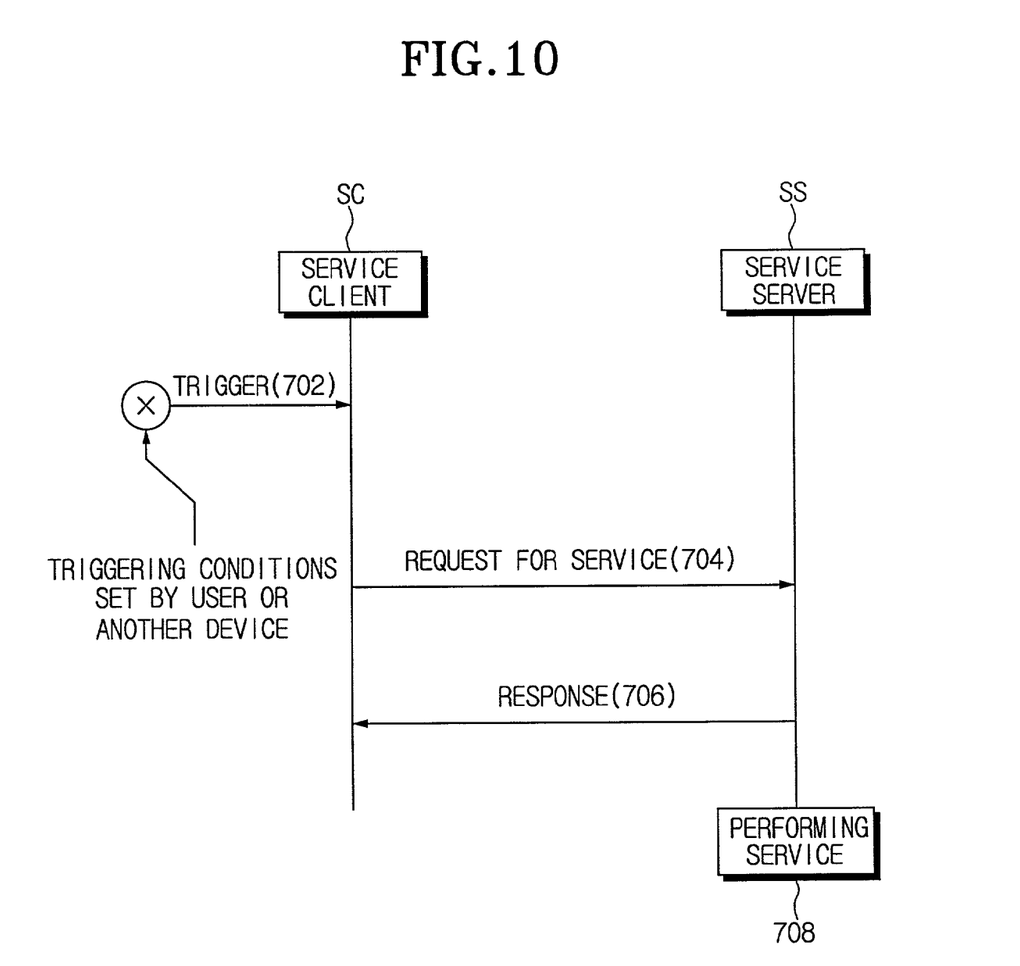
FIG. 10 is a flow chart illustrating a flow of signals in a method for providing services through commands.

The service client SC within the home network is triggered if it meets trigger conditions preset by the user or another device (step 702). Then, the service client SC requests a service to the service server SS (step 704), and the service server SS finds a command code corresponding to the requested service to perform the service (step 706).

According to the present invention, the devices within network can provide services. According to the present invention, not only intelligent devices but also dummy devices can provide services.

Also, devices can be requested to provide services through user interface operated by users or a command implemented by other devices.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for operating a lookup server in an IP-based network system, the method comprising:

receiving, by the lookup server in the IP-based network system, device information of an IP device and a non-IP device from each of a plurality of devices including at least one of the IP device, which is capable of direct allocation of an IP address, and the non-IP device, which is incapable of direct allocation of IP address, the device information of the IP device and the non-IP device including an IP address corresponding to a transmitting device;

managing, by the lookup server in the IP-based network system, the device information of the IP device and the non-IP device and providing the device information of the IP device and the non-IP device according to a user selection; and indirectly allocating the non-IP device with the IP address via a service agent.

2. The method of claim 1, wherein the managing comprises:

displaying a master page including the device information of the IP device and the non-IP device; and if information to select a device to control is received, providing a list of services corresponding to the received information.

3. The method of claim 2, wherein the master page comprises at least one of icon and device name to correspond to the plurality of devices.

4. The method of claim 2, further comprising reconstructing the master page, if a connection status between devices of the network changes or if a user accesses the lookup server.

5. The method of claim 1, wherein the device information of the IP device and the non-IP device includes at least one of a allocated IP address, an URL, a device type, a vendor, a model name, and a serial number.

6. The method of claim 1, wherein the managing comprise at least one of device information registration, cancellation of registered device information, and providing of device information.

7. The method of claim 1, wherein the user selection is input through a user interface device connected to the lookup server.

* * * * *